United States Patent
Hebbard et al.

(10) Patent No.: US 7,013,627 B2
(45) Date of Patent: Mar. 21, 2006

(54) BAGGING DEVICE FOR A LAWNMOWER

(75) Inventors: Jeffery T. Hebbard, Brillion, WI (US);
Fredric D. Schreiner, DePere, WI (US); Robert T. Woelfel, Hilbert, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/661,859

(22) Filed: Sep. 12, 2003

(65) Prior Publication Data
US 2005/0055994 A1  Mar. 17, 2005

(51) Int. Cl.
*A01D 43/00*  (2006.01)
(52) U.S. Cl. ........................................ 56/202
(58) Field of Classification Search ............... 56/199, 56/202, 205, 206, 194, 203, DIG. 9
See application file for complete search history.

(56) References Cited

U.S. PATENT DOCUMENTS

| | | | |
|---|---|---|---|
| 421,370 A | | 2/1890 | Kelley |
| 1,182,365 A | * | 5/1916 | Goldberg ............ 56/199 |
| 1,686,934 A | | 10/1928 | Serva |
| 2,250,846 A | * | 7/1941 | Sullivan ............ 56/199 |
| 2,525,090 A | | 10/1950 | Bott |
| 2,654,106 A | | 10/1953 | Parker |
| 2,727,264 A | | 12/1955 | Dunham |
| 2,801,862 A | | 8/1957 | Parker et al. |
| 2,959,904 A | * | 11/1960 | Ferris ............ 56/344 |
| 2,965,910 A | | 12/1960 | Van Rainst |
| 3,065,588 A | * | 11/1962 | Shaw ............ 56/13.4 |
| 3,119,136 A | * | 1/1964 | Newsom ............ 15/79.1 |
| 3,134,118 A | * | 5/1964 | Henry ............ 15/79.1 |
| 3,636,686 A | | 1/1972 | Meyer et al. |
| 3,678,665 A | | 7/1972 | Stanke |
| 3,694,855 A | | 10/1972 | Meyer et al. |
| 3,726,069 A | * | 4/1973 | Cope ............ 56/202 |
| 3,805,500 A | | 4/1974 | Sweet |

(Continued)

FOREIGN PATENT DOCUMENTS

EP   009774 A1 * 9/1979 ............ 56/202

(Continued)

OTHER PUBLICATIONS

Ariens Company brochure: Start a Family Tradition; published prior to Sep. 12, 2003 (4 pages).

*Primary Examiner*—Thomas B. Will
*Assistant Examiner*—Alicia Torres
(74) *Attorney, Agent, or Firm*—Michael Best & Friedrich LLP

(57) ABSTRACT

A bagging device for use on a lawnmower includes a frame, a bag attached to the frame and having a bag opening aligned with a discharge opening on the lawnmower, and at least one wheel rotatably mounted to the frame. During operation of the lawnmower, vegetation clippings from the lawnmower are collected in the bag. When the bagging device is mounted on the lawnmower, the at least one wheel is in a stowed condition and does not support any weight of the bagging device. The at least one wheel is generally at the top of the bagging device when the bagging device is attached to the lawnmower. When the bagging device is detached from the lawnmower, the bagging device is flipped or toppled over to position the at least one wheel at the bottom of the bagging device to facilitate rolling the bagging device away from the lawnmower.

15 Claims, 5 Drawing Sheets

U.S. PATENT DOCUMENTS

| | | |
|---|---|---|
| 3,905,221 A | 9/1975 | Wolfe |
| 4,043,102 A * | 8/1977 | Uhlinger et al. ............. 56/17.4 |
| 4,084,284 A | 4/1978 | Hastings |
| 4,262,475 A | 4/1981 | Takahashi et al. |
| 4,345,418 A * | 8/1982 | Arizpe ........................ 56/202 |
| 4,478,031 A * | 10/1984 | Wolf ........................... 56/202 |
| 4,598,536 A | 7/1986 | Langley |
| 6,050,576 A | 4/2000 | Tanner et al. |
| 6,735,930 B1 * | 5/2004 | Sugiyama et al. ............ 56/202 |

FOREIGN PATENT DOCUMENTS

JP        5-219815    *   8/1993

* cited by examiner

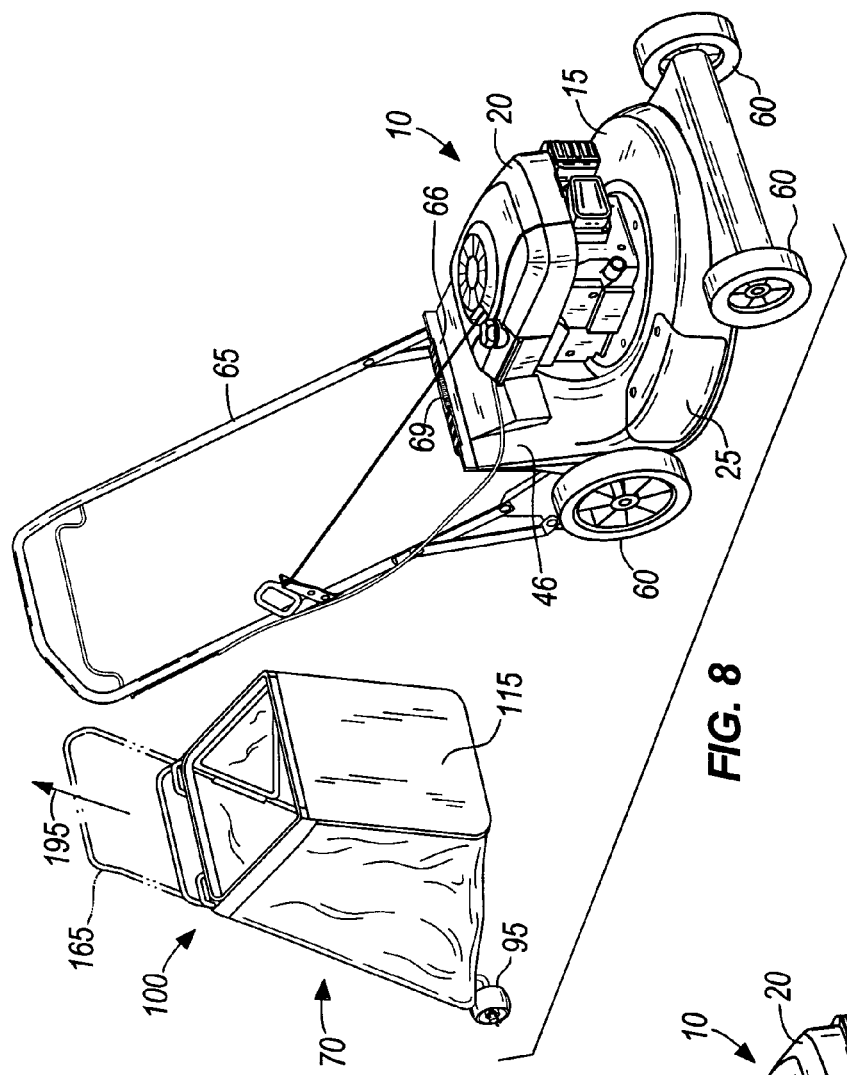
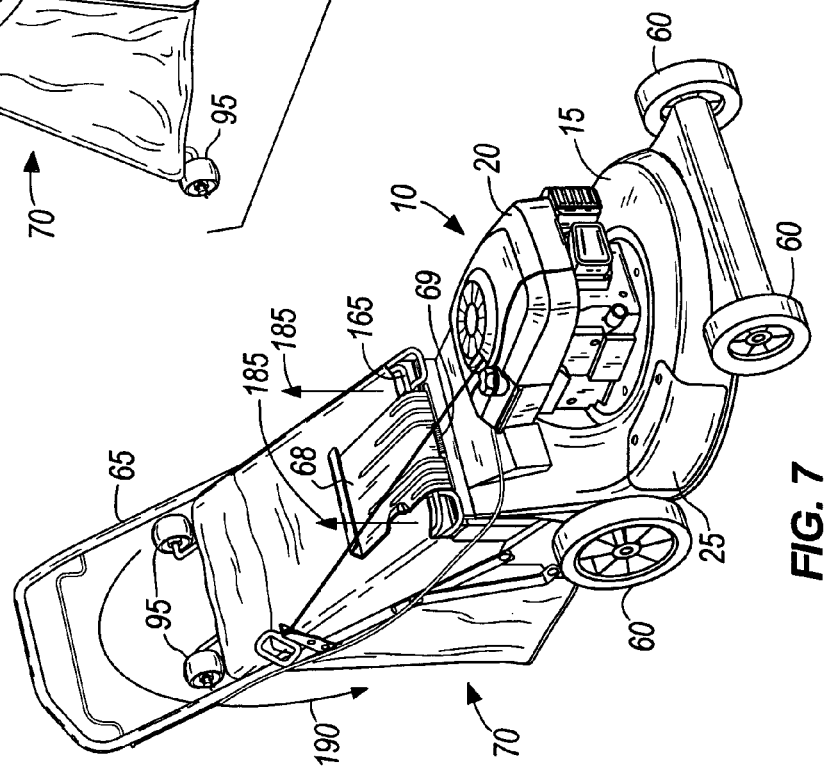
FIG. 8
FIG. 7

BAGGING DEVICE FOR A LAWNMOWER

BACKGROUND

The invention relates to a bagging device for a lawnmower.

SUMMARY

The invention provides a lawnmower comprising a deck having a discharge opening; an engine supported by the deck and having an output shaft rotating in response to operation of the engine; a cutting blade interconnected with the output shaft under the deck and rotatable in response to rotation of the output shaft to cut vegetation; a mower handle attached to the deck and extending upwardly therefrom; and a bag assembly releasably attached to the rest of the lawnmower.

The bag assembly includes a frame; a bag attached to the frame and having a bag opening aligned with the discharge opening; and at least one wheel rotatably mounted to the frame. During lawnmower operation, the at least one wheel is in a stowed condition and clippings from under the deck are discharged into the bag through the discharge opening and bag opening. At the lawnmower operator's discretion, the lawnmower may be stopped and the bag assembly detached from the rest of the lawnmower to haul away clippings in the bag. To facilitate hauling the clippings away, the at least one wheel at least partially supports the bag assembly only when the bag assembly is detached from the rest of the lawnmower.

The invention also provides a bag handle that is part of the bag assembly. The bag handle facilitates hauling the clippings away in the bag assembly. The bag handle is be movable between an extended condition and a retracted condition. The bag handle may be put in the retracted condition to facilitate a compact bag assembly for attachment to the rest of the lawnmower. The bag handle may be moved into the extended condition for hauling the bag assembly away.

The bag assembly may be attached to the rest of the lawnmower in a generally upside-down orientation compared to the orientation of the bag assembly when hauling clippings away. More specifically, the at least one wheel is at the top of the bag assembly when the bag assembly is mounted to the rest of the lawnmower.

Other features and advantages of the invention will become apparent to those skilled in the art upon review of the following detailed description, claims, and drawings.

BRIEF DESCRIPTION OF THE DRAWINGS

FIG. 7 is a perspective view of the lawnmower with arrows indicating how the bag assembly is detached from the rest of the lawnmower.

FIG. 8 is a perspective view of the lawnmower with the bag assembly detached from the rest of the lawnmower.

Figure 1:
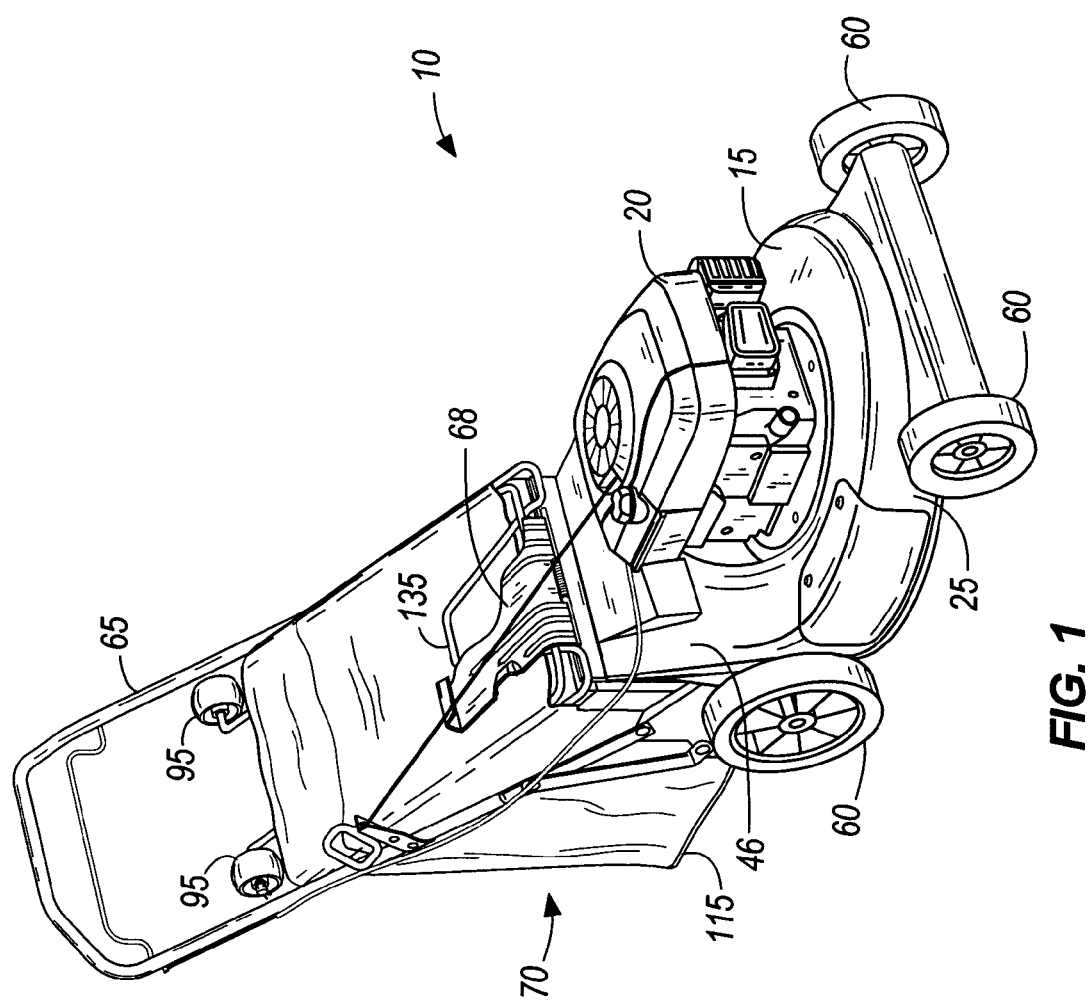
FIG. 1 is a perspective view of a lawnmower embodying the invention, with a portion cut away for illustrative purposes.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

Figure 2:
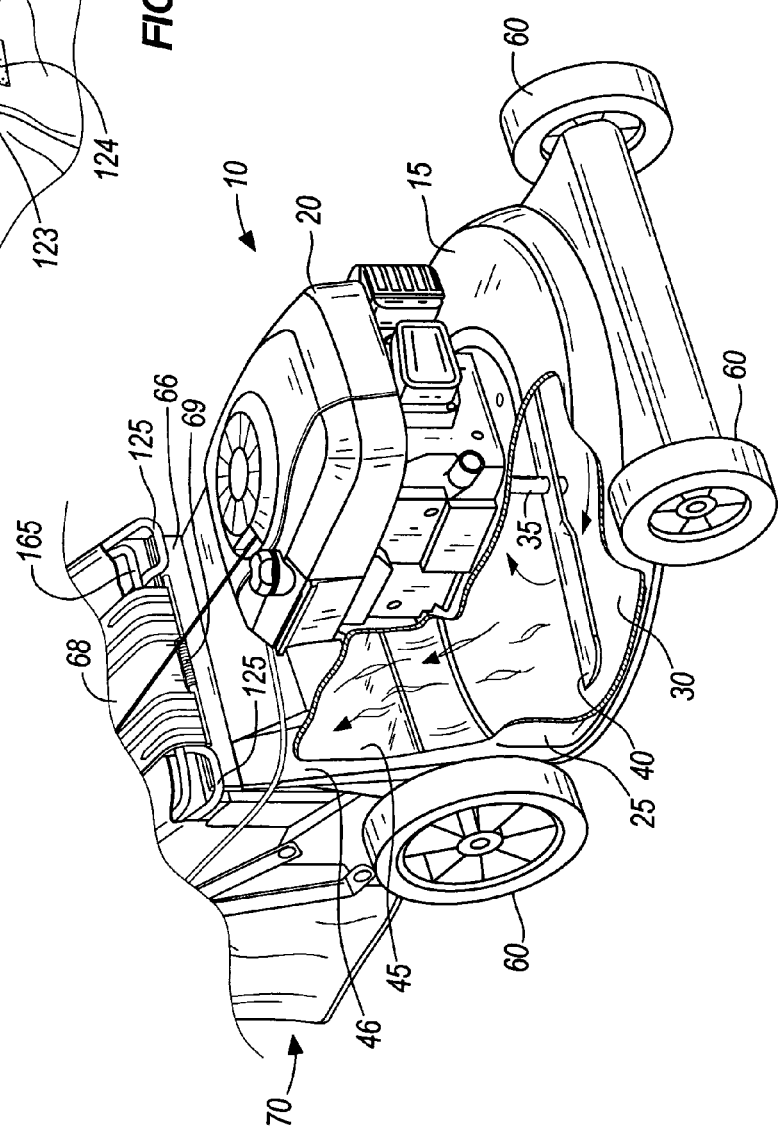
FIG. 2 is a partially cut-away perspective view of a portion of the lawnmower.

FIGS. 1 and 2 illustrate a lawnmower 10 which includes a deck having a support surface 15 that supports an engine 20. The deck also has side portions 25 extending down from the support surface 15 to define a cutting space 30 under the deck. The engine 20 has an output shaft 35 that extends through the support surface 15 and into the cutting space 30. The output shaft 35 is rotatable in response to operation of the engine 20. A cutting blade 40 is mounted to the output shaft 35 and is rotatable therewith to cut grass and other vegetation in the cutting space 30. The cutting blade 40 also creates a whirlwind in the cutting space 30 to cause clippings to swirl around within the cutting space 30. In other embodiments there may be multiple blades on separate shafts under the deck. In such alternative embodiments, the separate shafts are coupled (e.g., with belts or chains) to the output shaft 35 of the engine 20 and rotate in response to rotation of the output shaft 35.

The deck includes a discharge opening 45 the rear 46 of the deck. Clippings are permitted to escape from the cutting space 30 through the discharge opening 45. A plurality of mower wheels 60 support the mower deck and a mower handle 65 is interconnected to and extends up from the deck. The mower handle 65 is manipulated by a lawnmower operator to move the lawnmower 10 on the mower wheels 60. In this regard, the mower wheels 60 and mower handle 65 facilitate movement of the lawnmower 10.

A plate 66 is mounted to the rear 46 of the deck. The plate 66 may be considered part of the deck even though it is a separate part because the plate is permanently affixed to the deck (e.g., by welding). Alternatively, the plate may be an integral part of the deck or may be a separate part that is mounted with fasteners to the deck. A door 68 is pivotally mounted to the top of the plate 66 and is biased with a torsion spring 69 to close the discharge opening 45 unless the door 68 is propped open. A bag assembly 70 is releasably attached to the plate 66 (see FIGS. 2 and 8) and props the door 68 open, as will be explained in more detail below.

Figure 3:
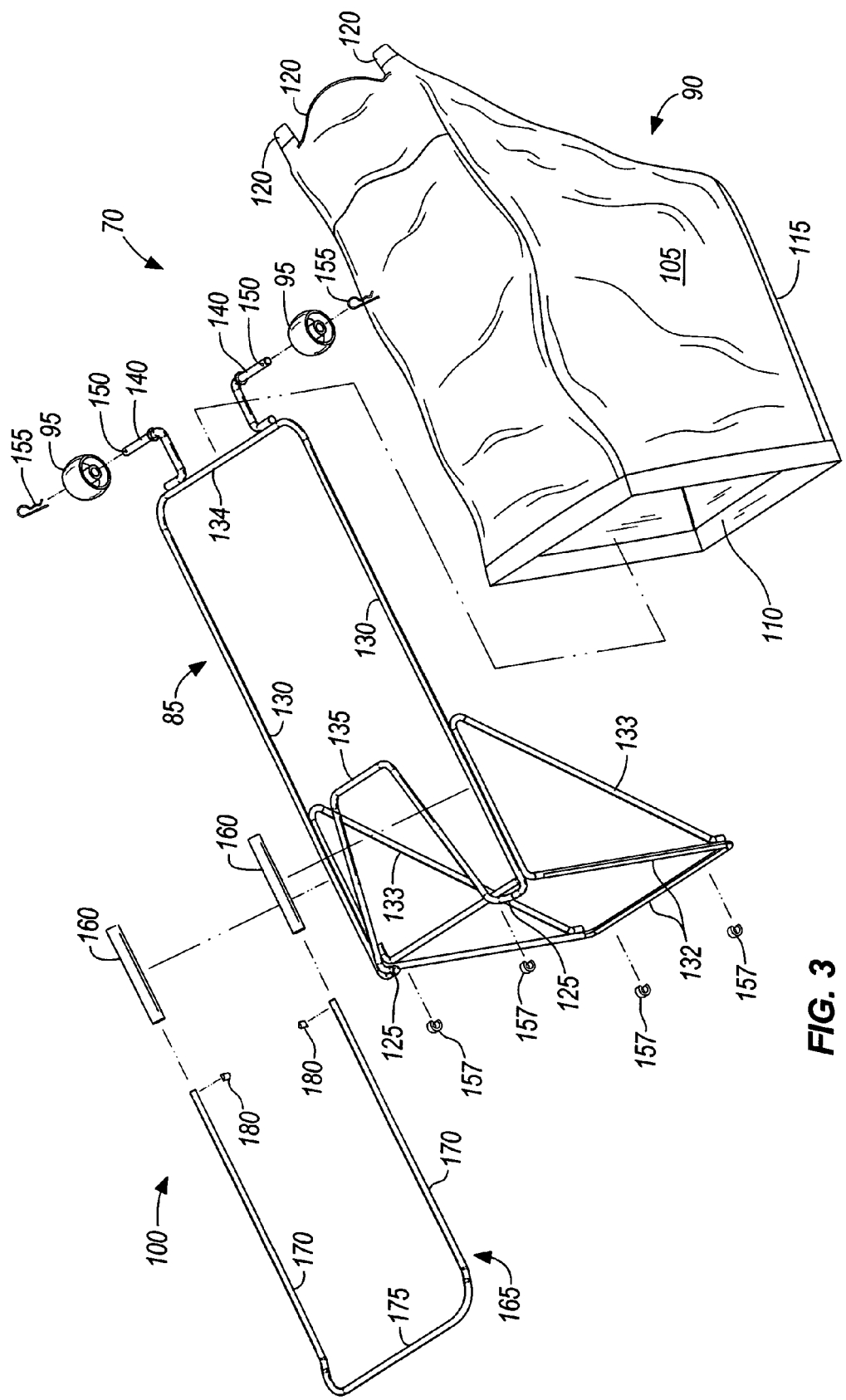
FIG. 3 is an exploded view of the bag assembly portion of the lawnmower.

With reference to FIG. 3, the bag assembly 70 includes a frame 85, a bag 90, a pair of bag wheels 95, and a bag handle assembly 100. The bag 90 includes main body 105 and a bag opening 110. The bag 90 is preferably constructed of a durable, rugged nylon or some other material for containing vegetation clippings and handling the rugged environment of lawn and garden care. The bottom surface 115 of the bag 90 is preferably relatively rigid or stiff to give the bag 90 structure and ensure that the bag opening 110 is open during lawnmower use.

Figure 4:
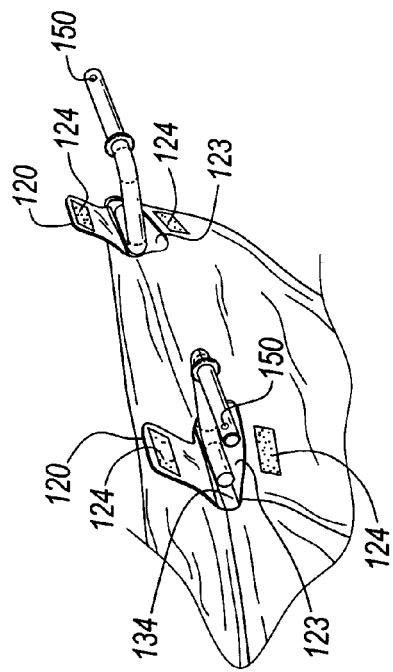
FIG. 4 is an enlarged perspective view of a portion of the bag assembly.

With reference to FIGS. 3 and 4, the bag 90 also includes fabric loops or flaps 120, which in the illustrated embodiment extend from the bag body 105 adjacent a pair of slits 123 in an edge of the bag 90 near the bag wheels 95. The flaps 120 and bag body 105 have pads 124 of a hook-and-loop fastener, such as Velcro brand, or another suitable connecting device (e.g., snaps, hooks, or any other suitable fastener) so that the flaps 120 can be releasably secured across the slits 123 to close the slits 123. The flaps 120 also facilitate mounting the bag 90 to the frame 85, as will be discussed in more detail below.

Referring again to FIG. 3, the frame 85 is constructed of steel or another suitable rigid material. The frame 85 includes a pair of attachment bars 125 (see also FIG. 2) that engage the corners of the plate 66. To properly align the bag opening 110 with the discharge opening 45 so clippings can flow into the bag 90, the door 68 must first be pivoted open. The attachment bars 125 are then positioned over the corners of the plate 66. The door 68 then engages the top of the bag assembly 70 (with the bag handle assembly 100 trapped between the door 68 and the bag 90). The bag assembly 70 is biased by its own weight and by the spring 69 and door 68 to pivot about the attachment bars 125 against the plate 66 and the rear 46 of the deck, with the bag opening 110 aligned with the discharge opening 45.

The frame 85 includes side members 130, bag opening members 132, truss members 133, and an axle-mounting member 134. The frame also includes a lifting bar 135 (also seen in FIG. 1 outside the bag 90 and under the door 68) which the lawnmower operator may grasp when it is time to remove the bag assembly 70. The frame 85 also includes a pair of wheel axles 140 that are welded or otherwise rigidly affixed to the axle-mounting member 134. The axles 140 rotatably supporting the bag wheels 95.

The bag wheels 95 are preferably constructed of a plastic material such as polypropylene, but may be made of other suitable material such as, but not limited to, metal or rubber. The bag wheels 95 have central hubs that slide over the axles 140, and the end portions of the axles extend out beyond the bag wheels 95. The axles 140 include transverse holes 150 (see also FIG. 4) at their ends. A hair pin cotter 155 may be positioned in each hole 150 to prevent the wheels 95 from sliding off the ends of the axles 140 (see also FIGS. 5 and 6). The hair pin cotters 155 are preferably constructed of spring steel and are preferably mechanically plated with yellow zinc, but any suitable material is contemplated by this invention, and any suitable pin, cap, or other blocking device may be used in place of the illustrated hair pin cotters 155 to retain the bag wheels 95 on the axles 140.

With reference to FIGS. 3 and 4, when assembling the bag assembly 70, the frame 85 is slid into the bag 90 with the wheel axles 140 extending out the slits 123 in the bag 90. The fabric flaps 120 of the bag 90 are then extended over the axle-mounting member 134 of the frame 85 and around the bases of the axles 140, and are secured to the bag via the hook-and-loop fastener pads 124. This closes the slits 123 and conforms the bag 90 around the axle-mounting member 134 and the bases of the axles 140 for a snug fit. Additional fabric flaps 120 may be employed around the bag opening 110 and secured around the bag opening members 132 of the frame 85. Alternatively, other mechanical attachment means, such as the illustrated clips 157 or another suitable connecting device (e.g., snaps, hooks, or any other suitable fastener) may be used to anchor the bag opening 110 to the bag opening members 132 of the frame 85.

The side members 130, bag opening members 132, truss members 133, and axle-mounting member 134 are all within the bag 90 and keep the bag body 105 and opening 110 in an open condition to facilitate filling the bag 90 with clippings. The lifting bar 135 is outside of the bag 90 so the lawnmower operator may grasp the lifting bar 135 to remove the bag assembly 70 from the rest of the lawnmower.

With continued reference to FIG. 3, the bag handle assembly 100 includes a pair of fixed tubes 160 affixed to the side members 130 of the frame 85 (e.g., by welding, brazing or another appropriate metallurgical bonding method, or with mechanical fasteners) and also includes a bag handle 165. The bag handle 165 includes side tubes 170 that slide within the fixed tubes 160, and also includes a cross member 175 interconnecting the side tubes 170. The cross member 175 provides a convenient handle for the operator of the lawnmower 10 when hauling the bag assembly 70 away from the rest of the lawnmower 10 (as will be discussed below).

The side tubes 170 include enlarged ends that prevent the sides tubes 170 from sliding out of the fixed tubes 160. The illustrated enlarged ends have a generally hemispherical member or a spot of welding material 180 welded to the sides of the ends of the side tubes 170. The hemispherical member 180 is affixed to the side tubes 170 after the side tubes 170 have been received in the fixed tubes 160 during initial construction of the bag handle assembly 100. The enlarged ends may be provided in other ways (e.g., mechanically distorting the ends of the side tubes 170 or extending pins through the ends of the side tubes 170), provided the function of preventing the side tubes 170 from sliding all the way out of the fixed tubes 160 is achieved.

Figure 5:
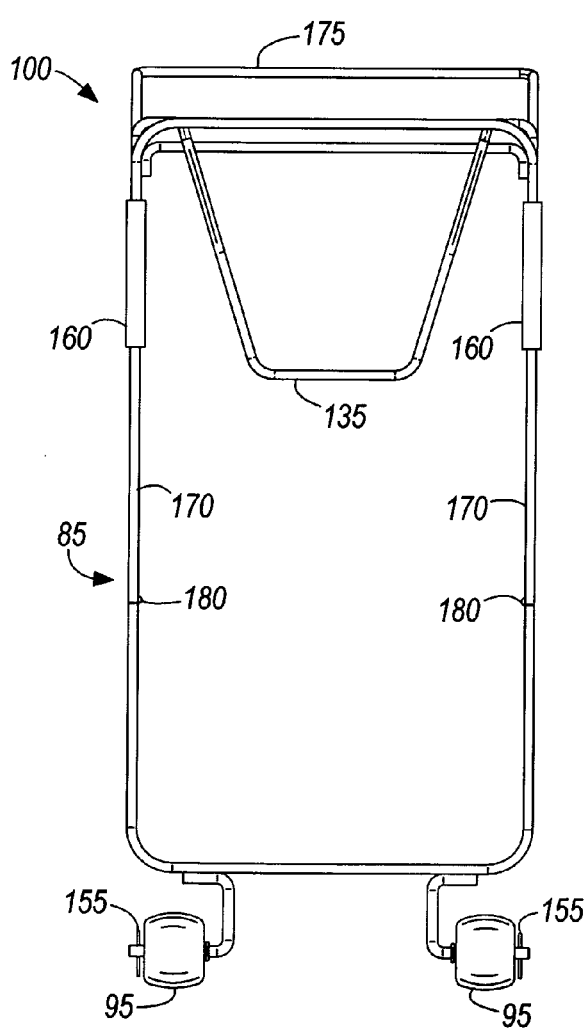
FIG. 5 is a front view of the bag assembly with the bag handle in a retracted condition.
Figure 6:
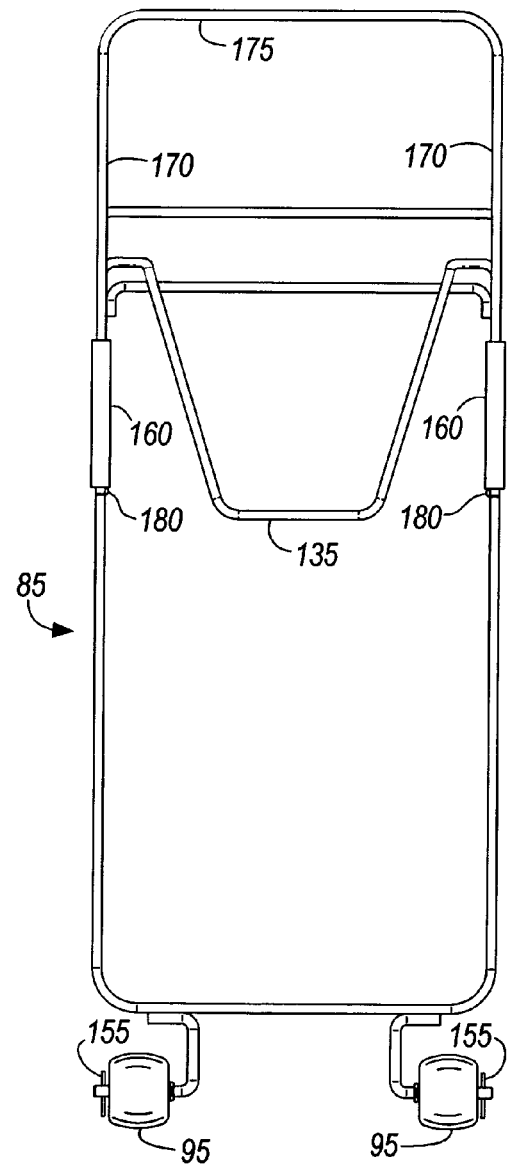
FIG. 6 is a front view of the bag assembly with the bag handle in an extended condition.

As seen in FIGS. 5 and 6, the bag handle 165 is movable between a retracted condition (FIG. 5) and an extended condition (FIG. 6). In the illustrated embodiment, the side tubes 170 slide within the fixed tubes 160 in a telescoping manner. However, the invention contemplates other methods for moving the bag handle 165 between the retracted and extended conditions. For example, and without limitation, the bag handle 165 may be pivotally interconnected to the frame between retracted and extended conditions. Alternatively, the bag handle 165 may be removable from the bag assembly frame 85, in which case the bag handle 165 would be in the "retracted condition" when removed and in the "extended condition" when attached to the frame 85.

In the illustrated embodiment, the bag handle 165 must be in the retracted condition to provide clearance for the bag assembly 70 to be mounted on the plate 66. More specifically, the bag handle 165 must be in the retracted condition to permit the attachment bars 125 of the frame 85 to be placed over the corners of the plate 66, and to permit the bag opening 110 to be positioned immediately adjacent the discharge opening 45. The bag handle 165 is between the door 68 and the bag 90 when the bag assembly 70 is mounted on the plate 66. The bag handle 165 may not be extended during operation of the lawnmower 10 because its extension is blocked by the plate 66 and door 68, but may be extended after the bag assembly 70 is detached from the rest of the lawnmower 10.

Referring now to FIGS. 7 and 8, when the bag assembly 70 is lifted up (as indicated with arrows 185) with the lifting bar 135, the attachment bars 125 are lifted out of engagement with the plate 66, and the door 68 is temporarily deflected upwardly to provide clearance for separating the bag assembly 70 from the rest of the lawnmower 10. When the bag assembly 70 is pulled clear of the door 68, the door 68 snaps shut over the discharge opening 45 under the biasing force of the spring 69. The bag assembly 70 is then toppled or flipped over as indicated with arrow 190 in FIG. 7 so that the bag opening 110 opens upwardly and the bag wheels 95 are under the bag 90.

The handle 165 is then moved into the extended condition (illustrated in phantom in FIG. 8) in the direction indicated with arrow 195, and the bag assembly 70 is tipped so the bag wheels 95 support the entire weight of the bag assembly 70 and clippings within the bag 90. The handle 165 is at the top of the bag assembly 70 in this orientation so that the operator may conveniently grasp the handle 165 and push or pull the bag assembly 70 on the bag wheels 95.

Comparing FIGS. 7 and 8, when attached to the rest of the lawnmower 10, the bag assembly 70 is in a substantially upside-down orientation with respect to the orientation it is in when hauling clippings away. In FIG. 7, the bag wheels 95 are at the top of the bag assembly 70. In this regard, the bag wheels 95 are inoperable or stowed during operation of the lawnmower 10 in the sense that they do not touch the ground and do not support the bag assembly 70. On the other hand, in FIG. 8, the bag wheels 95 are on the bottom of the bag assembly 70 and, in this orientation, support the weight of the bag assembly 70 to facilitate rolling it away from the rest of the lawnmower 10 to a dumping site for the clippings. The bag assembly 70 must therefore be flipped or toppled end-over-end when removing the bag assembly from the rest of the lawnmower and putting the bag assembly 70 in the proper orientation for hauling the vegetation clippings away.

Also, the bag opening 110 is generally at the bottom of the bag 90 when the bag assembly 70 is mounted on the plate 66, and is generally at the top of the bag 90 when the bag assembly 70 is being hauled away on its wheels 95. Having the bag opening 110 face upwardly while hauling clippings away reduces the amount of clippings that may fall out of the bag 90. The snug fit of the flaps 120 around the axle-mounting members 134 and the bases of the axles 140 reduces the likelihood that clippings will escape from the bag 90 through the slits 123 during transport of the bag assembly 70.

The illustrated bag assembly 70 may be provided as an after-market accessory or sold with the rest of the lawnmower 10. As an after-market part, the bag assembly 70 may replace any existing bag assembly of another preexisting lawnmower, provided the bag assembly of the present invention attaches to the other lawnmowers properly. In this regard, the means for interconnecting the bag assembly of the present invention (i.e., the attachment bars 125 engaging the corners of the plate 66) may be modified to retrofit the bag assembly 70 of the present invention to fit preexisting lawnmowers. Also, the size of the bag opening 110 may be modified to match the discharge openings of other lawnmowers.

What is claimed is:

1. A lawnmower comprising:
a deck having a discharge opening;
an engine supported by said deck and having an output shaft rotating in response to operation of said engine;
a cutting blade interconnected with said output shaft under said deck and rotatable in response to rotation of said output shaft to cut vegetation;
a mower handle attached to said deck and extending upwardly therefrom;
a bag assembly releasably attached to the rest of said lawnmower, said bag assembly including a frame, a bag attached to said frame and having a bag opening aligned with said discharge opening, and at least one wheel rotatably mounted to said frame, said at least one wheel being in a stowed condition during lawnmower operation; and
a bag handle coupled to the bag assembly, the bag handle movable between an extended position and a retracted position only when the bag assembly is detached from the rest of the lawnmower,
wherein during operation of said lawnmower, clippings from under said deck are discharged into said bag through said discharge opening and bag opening;
wherein said bag assembly is detachable from the rest of said lawnmower to haul away clippings in said bag;
wherein, to enable rolling said bag assembly away from the rest of said lawnmower, said at least one wheel at least partially supports said bag assembly only when said bag assembly is detached from the rest of said lawnmower, and wherein said bag assembly is oriented with said at least one wheel on top when said bag assembly is attached to the rest of said lawnmower, and wherein said bag assembly is oriented with said at least one wheel on the bottom when rolling said bag assembly away from the rest of said lawnmower; and
further comprising a door pivotally attached to said deck and a biasing member biasing said door to a position covering said discharge opening, wherein said door must be opened to permit said bag assembly to be attached to the rest of said lawnmower, wherein said door engages a top surface of said bag assembly when said bag assembly is attached to the rest of said lawnmower, and wherein said bag handle is between said door and said bag when said bag assembly is attached to the rest of the lawnmower.

2. The lawnmower of claim 1, wherein said bag assembly includes an axle interconnected with said frame and wherein said at least one wheel is mounted for rotation on said axle.

3. The lawnmower of claim 1, wherein said bag handle includes first and second fixed tubes rigidly affixed to opposite sides of said frame, first and second moving tubes within said fixed tubes and movable with respect to said fixed tubes, and a cross portion interconnecting said first and second moving tubes.

4. The lawnmower of claim 1, wherein said bag handle must be in said retracted condition to enable said bag assembly to be attached to the rest of said lawnmower, and wherein said bag handle is movable to said extended condition when said bag assembly is detached from the rest of said lawnmower to facilitate rolling said bag assembly away from the rest of said lawnmower.

5. A lawnmower comprising:
a deck having a discharge opening;
an engine supported by said deck and having an output shaft rotating in response to operation of said engine;
a cutting blade interconnected with said output shaft under said deck and rotatable in response to rotation of said output shaft to cut vegetation;
a mower handle attached to said deck and extending upwardly therefrom;
a bag assembly releasably attached to the rest of said lawnmower, said bag assembly including a frame, a bag attached to said frame and having a bag opening aligned with said discharge opening, and at least one wheel rotatably mounted to said frame, said at least one wheel being in a stowed condition during lawnmower operation; and
a bag handle coupled to the bag assembly, the bag handle movable between an extended position and a retracted position only when the bag assembly is detached from the rest of the lawnmower, wherein during operation of said lawnmower, clippings from under said deck are discharged into said bag through said discharge opening and bag opening;

wherein said bag assembly is detachable from the rest of said lawnmower to haul away clippings in said bag;

wherein, to enable rolling said bag assembly away from the rest of said lawnmower, said at least one wheel at least partially supports said bag assembly only when said bag assembly is detached from the rest of said lawnmower, and wherein said bag assembly is oriented with said at least one wheel on top when said bag assembly is attached to the rest of said lawnmower, and wherein said bag assembly is oriented with said at least one wheel on the bottom when rolling said bag assembly away from the rest of said lawnmower; and wherein said bag handle includes a fixed portion rigidly affixed to said frame and a moving portion in telescoping relation to said fixed portion.

6. A lawnmower comprising:

a deck having a discharge opening;

an engine supported by said deck and having an output shaft rotating in response to operation of said engine;

a cutting blade interconnected with said output shaft under said deck and rotatable in response to rotation of said output shaft to cut vegetation;

a mower handle attached to said deck and extending upwardly therefrom;

a bag assembly releasably attached to the rest of said lawnmower, said bag assembly including a frame, a bag attached to said frame and having a bag opening aligned with said discharge opening, and at least one wheel rotatably mounted to said frame, said at least one wheel being in a stowed condition during lawnmower operation; and a bag handle coupled to the bag assembly, the bag handle movable between an extended position and a retracted position only when the bag assembly is detached from the rest of the lawnmower, wherein during operation of said lawnmower, clippings from under said deck are discharged into said bag through said discharge opening and bag opening;

wherein said bag assembly is detachable from the rest of said lawnmower to haul away clippings in said bag;

wherein, to enable rolling said bag assembly away from the rest of said lawnmower, said at least one wheel at least partially supports said bag assembly only when said bag assembly is detached from the rest of said lawnmower, and wherein said bag assembly is oriented with said at least one wheel on top when said bag assembly is attached to the rest of said lawnmower, and wherein said bag assembly is oriented with said at least one wheel on the bottom when rolling said bag assembly away from the rest of said lawnmower;

wherein said bag assembly further includes a means for attaching said bag assembly to the rest of said lawnmower, at least one axle, and a lifting bar to facilitate lifting said bag assembly with respect to the rest of said lawnmower; wherein said at least one wheel is supported for rotation on said at least one axle; and wherein all of said frame is contained within said bag except for said means for attaching, said lifting bar, and said at least one axle; and wherein said bag includes a slit through which said at least one axle extends, and wherein said bag further includes at least one flap for releasably closing said slit during operation of said lawnmower.

7. A bag assembly for use on a lawnmower having a deck with a discharge opening, the bag assembly comprising:

a frame;

means for releasably mounting the frame to the lawnmower;

a bag supported by the frame and having a bag opening aligning with the discharge opening when the bag assembly is mounted on the lawnmower;

a bag handle coupled to the frame, the bag handle movable between an extended position and a retracted position, the bag handle positioned such that the lawnmower inhibits movement of the handle from the retracted position to the extended position when the frame is attached to the lawnmower;

at least one wheel rotatably mounted to the frame, the at least one wheel being in a stowed condition, in which it does not support the weight of the bag assembly, when the bag assembly is mounted on the lawnmower, and the at least one wheel at least partially supporting the bag assembly when the bag assembly is detached from the lawnmower to facilitate rolling the bag assembly away from the lawnmower, wherein the frame includes at least one axle rotatably supporting the at least one wheel, wherein the frame includes a lifting bar to facilitate lifting the bag assembly with respect to the lawnmower, and wherein all of the frame is contained within the bag except for the means for attaching, the lifting bar, and the at least one axle; and wherein the bag includes a slit through which the at least one axle extends, and wherein the bag further includes at least one flap for releasably closing the slit during operation of the lawnmower.

8. A lawnmower comprising:

a deck defining a discharge opening in a rear surface thereof;

an engine supported by said deck and having an output shaft extending down through said deck;

a cutting blade mounted to said output shaft for rotation therewith to cut vegetation within said cutting space;

a plate mounted to said rear surface of said deck;

a bag assembly including a pair of attachment bars releasably engaging said plate to attach said bag assembly to said deck, a frame, a bag supported by said frame and having a bag opening aligned with said discharge opening such that vegetation clippings flow out of said cutting space and into said bag, and a pair of axles mounted to said frame;

a door pivotally mounted to said plate and biased toward a closed position in which said door covers said discharge opening, said door being propped open by said bag assembly when said bag assembly is mounted on said deck such that said door is biased against said bag assembly to resist said attachment bars from disengaging said plate;

a bag handle coupled to the frame and movable between a retracted position and an extended position, said door inhibiting movement of said handle when said bag assembly is attached to said deck; and a pair of wheels rotatably supported by respective ones of said pair of axles;

wherein said bag assembly is mounted to said plate with said wheels at the top of said bag assembly such that said wheels are in a stowed condition and do not support the weight of said bag assembly during operation of said lawnmower; and wherein said bag assembly is toppled over when said bag assembly is detached from said deck such that said wheels are at the bottom of said bag assembly and said bag opening is at the top of said bag assembly, such that said bag assembly may be rolled away on said wheels.

9. The lawnmower of claim 8, further comprising a handle assembly interconnected with said bag assembly frame, said handle assembly including first and second fixed tubes mounted on respective first and second sides of said frame, and a handle assembly including first and second side tubes slidable within said fixed tubes and a cross member interconnecting said side tubes and providing a handle for a user to grasp when rolling said bag assembly away from the rest of said lawnmower.

10. The lawnmower of claim 8, further comprising a bag handle interconnected with said bag assembly and movable between a retracted condition and an extended condition, wherein said bag handle must be in said retracted condition when said bag assembly is mounted to said plate.

11. The lawnmower of claim 10, wherein said bag handle is movable between said retracted and extended conditions in a telescoping manner.

12. The lawnmower of claim 8, further comprising a bag handle mounted on said bag assembly, said bag handle being positioned between said bag and said door when said bag assembly is mounted to said plate.

13. A lawnmower comprising:
   a deck defining a discharge opening;
   an engine supported by the deck;
   a cutting blade rotating below the deck in response to operation of the engine; and
   a bag assembly releasably mounted to said deck and including a bag communicating with said discharge opening, at least one wheel, and a handle movable between a retracted condition and an extended condition; and
   wherein movement of said handle is inhibited when the bag assembly is attached to said deck such that the handle is movable into said extended condition only when said bag assembly is detached from said deck to facilitate rolling said bag assembly away from the rest of said lawnmower, and wherein said bag assembly includes at least one fixed tube, and wherein said handle includes at least one sliding tube that is in telescoping relation with said fixed tube for movement between said retracted and extended conditions.

14. The lawnmower of claim 13, further comprising a door pivotally interconnected with said deck and biased to cover said discharge opening, wherein said handle is positioned between said door and said bag when said bag assembly is mounted on the rest of the lawnmower such that said door inhibits movement of the handle.

15. The lawnmower of claim 13, wherein when said bag assembly is mounted to said deck, said handle must be in said retracted condition.

* * * * *